Figures 1, 2:
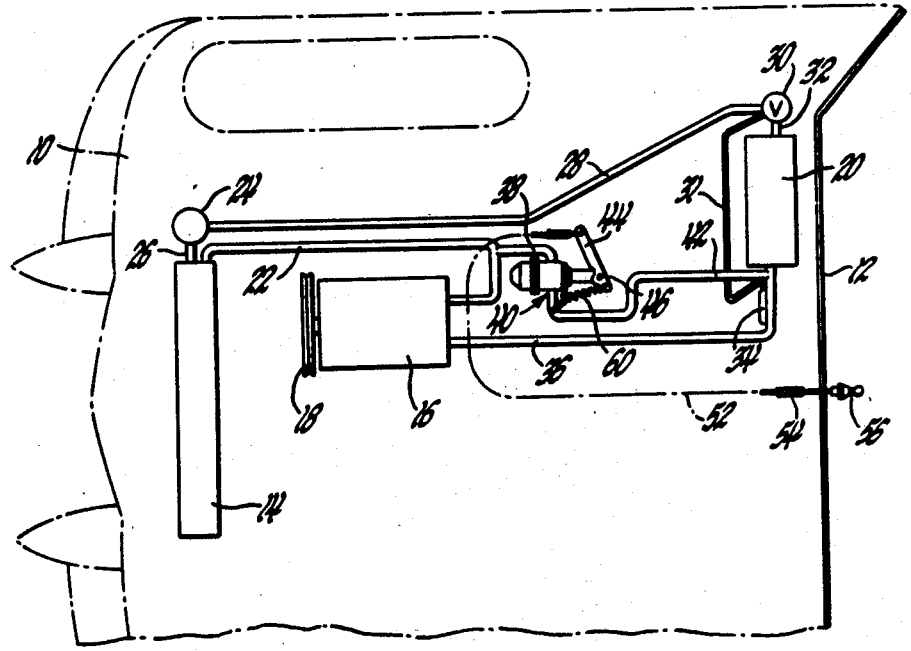

June 28, 1960     J. R. HOLMES ET AL     2,942,433
BY-PASS CONTROL IN AIR CONDITIONING SYSTEMS
Filed March 7, 1956

INVENTORS
John Ralph Holmes,
Robert R. Mandy &
Fred D. Taylor
BY J.W. Lovett
ATTORNEY

United States Patent Office 2,942,433
Patented June 28, 1960

2,942,433

BY-PASS CONTROL IN AIR CONDITIONING SYSTEMS

John R. Holmes, Robert R. Mandy, and Fred D. Taylor, Lockport, N.Y., assignors to General Motors Corporation, Detroit, Mich., a corporation of Delaware Filed Mar. 7, 1956, Ser. No. 570,201

5 Claims. (Cl. 62—197)

This invention relates to air conditioning systems and more particularly to air conditioning systems especially adapted for use in automotive vehicles.

In applying a refrigeration system for air conditioning the passenger compartment of a vehicle, it has been found expedient to provide a compressor for the refrigerant and to drive that compressor with the vehicle engine as the source of power. As a result, the great variation in the vehicle speeds has caused the compressor to be driven in such a way as to compress the refrigerant at a rate having little or no relation to the usable load placed upon the refrigeration system. Engagement or disengagement of a clutch driving the compressor is a common form of control but obviously is not sufficient if optimum conditions are to obtain. Control of a conventional expansion valve by virtue of the temperature of refrigerant discharge from the evaporator, of course, would have no effect to counteract the result of variation in out put of the compressor. Other expedients have been utilized such as thermo-sensitive elements placed in the path of the air being conditioned by the refrigeration system which elements are so arranged as to control the refrigerant flow. It is, of course, obvious that if additional thermo-sensitive elements are employed, greater costs and also uncertainties of operation and proper adjustment occur.

It is an object of the present invention to provide an improved air conditioning system in which a wide range in the rate of compressor operation will not unduly disturb the control of refrigerant flow in the evaporator.

Another object of the invention is to provide an air conditioning system in which freeze-up of the evaporator is prevented and by means of which the temperature of the conditioned air may be manually adjusted.

To these ends, a feature of the present invention pertains to a pressure actuated valve in a refrigerant flow line by-passing the evaporator of an air conditioning system and actuated by pressure of the refrigerant. Another feature of the invention pertains to an air conditioning system utilizing a by-pass valve influenced by the pressure of refrigerant at the discharge side of the evaporator to conduct refrigerant from the discharge side of a compressor to the upstream side of a thermostatic element controlling an expansion valve.

These and other important features of the invention will now be described in detail in the specification and then pointed out more particularly in the appended claims.

In the drawings:

Fig. 1 is a phantom plan view of the forward right-hand portion of a vehicle with an air conditioning system embodying the present invention installed thereon and diagrammatically illustrated; and Fig. 2 is an enlarged sectional view of a by-pass valve shown in the system of Fig. 1.

Fig. 1 depicts an automotive vehicle 10 in which the main components of an air conditioning system are installed forward of a fire wall 12 separating the engine compartment from the passenger compartment. As is customary in such installations, a condenser 14 is mounted immediately forward of the radiator, the latter not being illustrated. A compressor 16 is mounted in the engine compartment and is adapted to be driven from the crankshaft of the engine by means of a pulley 18. Immediately forward of the fire wall 12 is mounted an evaporator 20.

As is customary, the compressor 16 is provided with a conduit 22 for conducting high pressure refrigerant to the condenser 14. The cooled liquid refrigerant is conducted from the condenser to a receiver 24 by means of a line 26. This liquid is then conveyed by a conduit 28 to the evaporator 20 by way of an expansion valve 30 and a short conduit 32.

The expansion valve 30 is controlled by a thermostatic element or bulb 34 placed in heat exchange relation with a line 36 leading from the discharge side of the evaporator 20 to the compressor 16. The valve and bulb are connected by a line 31. A by-pass line 38 connects the conduit 22 to a by-pass valve 40 and the other side of the latter is connected by a conduit 42 to the discharge side of the evaporator 20 and upstream from the thermostatic element or bulb 34.

The by-pass valve 40 is provided with a lever 44 pivoted at 46 near one end of a cylindrical member 48 forming part of the valve 40. One end of the lever 44 is pivotally connected as at 50 to one end of a Bowden wire 52 guided by a conduit 54 to a push-pull knob 56 mounted within the passenger compartment and within convenient access to the operator of the vehicle.

The other end of the lever 44 is apertured as at 58 to receive one end of a coil spring 60. The other end of the spring 60 is hooked around a finger 62 integral with a supporting plate 64 for the valve 40.

The valve 40 has a main body 70 which is supported on the plate 64 by means of screws 72.

Interposed between one side of the plate 64 and the main body 70 is a flexible diaphragm 74. The stem 76 of a pilot or supplemental valve 78 abuts the central portion of the diaphragm 74. A member is fixed to the diaphragm on the side opposite the valve 78 as at 80 to enter and retain one end of a coil spring 82 which is enclosed within a chamber 84 formed in the projection 48. The member 80 bears an integral disc 86 contacting the diaphragm 74. A block 88 is fixed by means not shown within the axial chamber 84 and slidably receives the stem 90 of a spring retaining member 96. This member extends within one end of the coil spring 82. Fixed to the end of the stem 90 is a nylon disc 94 which is arranged to approach a shoulder 97 formed in the projection 48 when the spring 82 is further compressed as will appear hereinafter.

The lever 44 bears a curved portion 100 which may be moved against the end of the nylon cylinder 94. This curved portion is not concentric with the pin 46 and, therefore, is adapted to act as a cam permitting the spring 82 to expand when the lever 44 is swung counterclockwise by pulling on the knob 56.

The valve body 70 is provided with a threaded inlet port 102 adapted to be connected to the high pressure line 38 leading from the compressor and also is provided with an outlet port 104 adapted to be connected to the low pressure line 42 leading to the discharge side of the evaporator. The ports 102 and 104 communicate in offset relation with a cylinder 106 formed in the body 70 and flow from the port 102 through the cylinder 106 to the port 104 is controlled by a cylindrical member 108 reciprocable in the cylinder and which is attached to the center of a main valve diaphragm 110 by means of a screw 112. The valve 108 may be termed a "pre-set" valve and is slidable in a block 109 fixed within an enlarged portion of the cylinder 106. A plate 114 is interposed between the diaphragm and the head of the screw as is conventional in such devices. The screw 112 has an axial passage 113 connected with an oblique passage 115 in the valve 108. Opposite ends of the valve body 70 are recessed as at 116 and 118 to permit movement of the diaphragms 110 and 74, respectively. The margin of the diaphragm 110 is held to the body 70 by being interposed between the body and a circular flange 120 of a cup member 122. Screws 124 are used to maintain this relation. The cup 122 bears a flat surface 126 against which one end of a coil spring 128 bears. The other end of the spring 128 surrounds the head of the screw 112 and bears against the plate 114.

The pilot valve stem 76 is arranged to slide in a cylinder block 130 fixed to the body 70 and closing one end of the cylinder 106. This block is provided with a chamber adapted to be closed off by the valve 78 and also with a port communicating with a port 134' in the body 70 and leading to the recess 116. The body 70 also is provided with a passage 136 causing the recess 118 and the port 104 to be in communication. A spring 134 is inserted between the two valves 78 and 108.

In operation of the system, the flow of liquid refrigerant through the lines 28 and 32 to the evaporator 20 is controlled by the conventional thermostatic expansion valve 30, in turn operated by the usual thermal bulb 34 the latter being in thermal exchange relationship with the refrigerant outlet line 36 as set forth above. This controls the flow of refrigerant entering the evaporator and prevents a pressure build-up in the latter. The discharge line of the evaporator extracts heat from the bulb 34 and causes the expansion valve to close or partially close as is done in conventional practice. When used on vehicles, however, there are times when the load on the evaporator is light and the compressor 16 is driven at high speed. In such an event the pressure and the temperature in the evaporator would be too low and would cause moisture condensing on the exterior of the evaporator core to freeze. Formation of ice on the evaporator would, of course, disturb the operation of the system.

In utilizing the present invention, this freezing of the evaporator is prevented because of the operation of the by-pass lines 38 and 42 in controllably connecting the high pressure side of the compressor 16 to the refrigerant discharge side of the evaporator. If the pre-set valve 108 is caused to open, then heated refrigerant vapor from the outlet of the compressor will be conveyed to the outlet of the evaporator at a zone upstream from the thermostatic element 34. With the heated vapor being introduced into the line 36 ahead of the bulb 34, it will affect the operation of the thermostatic expansion valve 30 so that the latter will open to allow sufficient flow of refrigerant to maintain a high setting at the bulb 34. This assures a reasonable temperature in the compressor 16. With the hot vapor being introduced at the discharge side of the evaporator, the vapor will in no way adversely affect the evaporator performance but will have a tendency to insure maximum evaporator capacity at all times, especially in hot weather at speeds during which the valve 40 would be by-passing vapor.

If the heated vapor were introduced into the evaporator inlet in hot weather at high speeds when the maximum capacity of the evaporator is desired, the heated vapor by-passed would upset the capacity of the evaporator. If the hot vapor were introduced into the line 36 downstream from the thermostatic element 34, conditions may arise of maximum vapor by-passing causing excessive compressor temperature.

The present invention does not pertain to the structure of the valve 40 per se and, therefore, the details thereof are not material as other forms of valves may be used to carry out the invention. It should be noted, however, that for vehicle use it has been found that a desired evaporator pressure is normally 30 pounds per square inch. Assuming such is the case in a given installation, the valve 40 is so made and adjusted that the evaporator pressure (in the cup 122 and exerted on the diaphragm 110 by way of the passage 115 and 113) opposes the action of the spring 82 and maintains the valve 108 in such position as automatically to maintain the pre-set evaporator pressure.

When the evaporator pressure drops to or below the 30 pounds per square inch or "pre-set" setting, the diaphragm 74 permits the spring 82 to expand and the latter serves to open the valve 78 allowing heated vapor from the compressor to pass into the recess 116 by way of the port 134' and cause the main valve diaphragm 110 to move the main valve 108 from its seat permitting heated vapor to pass through that valve to the evaporator. These valves automatically position to permit sufficient flow of heated vapor to maintain the setting. The 30 pounds per square inch may be referred to as a setting for freeze protection of the evaporator. In the event a higher air discharge temperature from the evaporator or less air cooling is desired, the knob 56 may be pulled by the operator to rotate the lever 44 above the pivot 46 to open the valve 78. At this changed setting of the valve 40 the evaporator refrigerant will be at a higher pressure.

The spring 60 is utilized to minimize the effort required in actuating the Bowden wire and the spring 134 serves to return the pilot valve 78 to its closed position.

The valve 40, as shown in Fig. 2, is in its fully closed position, i.e. no heated by-pass vapors are flowing. Any variation in the evaporator pressure is quickly sensed by the supplemental or pilot valve arrangement and the latter promptly influences the main valve 108 to bring about the desired setting.

We claim:

1. An air conditioning system including a compressor, condenser, evaporator and refrigerant flow connections between said evaporator, compressor and condenser, valve means for controlling the admission of liquid refrigerant into said evaporator, control means responsive to the temperature of the refrigerant leaving said evaporator for controlling said valve means, and means responsive to the pressure in said evaporator for circulating relatively hot compressed gas discharged from said compressor to a point in said connections adjacent said evaporator and in close and thermal exchange relationship with said temperature responsive control means.

2. An air conditioning system comprising a compressor, condenser and evaporator connected for the flow of refrigerant, an expansion valve arranged to control the admission of refrigerant from said condenser into said evaporator, means including a thermostat adjacent to said evaporator and responsive to the temperature of the refrigerant discharged by said evaporator to said compressor, said thermostat being arranged to control said expansion valve, and means including a pressure actuated valve arranged to by-pass said evaporator and conduct refrigerant from the outlet of said compressor to the outlet side of said evaporator upstream from said thermostat.

3. An air conditioning system comprising a compressor, condenser and evaporator connected for the circulatory flow of refrigerant, an expansion valve arranged to control the admission of said refrigerant into said evaporator, a thermostat responsive to the refrigerant discharge temperature of said evaporator and arranged adjacent to the latter to control said expansion valve, means for by-passing said expansion valve and evaporator, said by-pass means including a valve and controlling the flow of refrigerant from the outlet of said compressor to the discharge side of said evaporator upstream of said thermostat, and said by-pass valve including an operative member actuated by the pressure of refrigerant in said evaporator.

4. An air conditioning system suitable for use in an automotive vehicle comprising a compressor, condenser and evaporator connected in series for the circulatory flow of refrigerant, an expansion valve arranged to admit refrigerant into said evaporator, thermostatic means responsive to the refrigerant discharge temperature of said evaporator and arranged to control said expansion valve, by-pass means including a by-pass valve arranged to conduct refrigerant from the high pressure side of said compressor to the discharge side of said evaporator to influence said thermostatic means, and said by-pass valve including a pre-set valve to determine the minimum evaporator temperature and a supplemental manually operable valve for adjusting the evaporator temperature.

5. A system such as set forth in claim 4 in which said pre-set and supplemental valves each include a diaphragm enclosed in the system for subjection to the pressure of the refrigerant at the discharge side of the said by-pass valve.

References Cited in the file of this patent

UNITED STATES PATENTS

| | | |
|---|---|---|
| 2,252,300 | McGrath | Aug. 12, 1941 |
| 2,286,961 | Hanson | June 16, 1942 |
| 2,311,622 | Alexander et al. | Feb. 23, 1943 |
| 2,313,391 | Newton | Mar. 9, 1943 |
| 2,344,215 | Soling et al. | Mar. 14, 1944 |
| 2,454,263 | Newton | Nov. 16, 1948 |
| 2,579,439 | Noe | Dec. 18, 1951 |
| 2,707,868 | Goodman | May 10, 1955 |
| 2,774,219 | Kelley | Dec. 18, 1956 |
| 2,774,220 | Heym | Dec. 18, 1956 |
| 2,807,151 | Baker | Sept. 24, 1957 |